United States Patent [19]

Levinson et al.

[11] Patent Number: 5,479,911
[45] Date of Patent: Jan. 2, 1996

[54] DIAMOND IMPREGNATED RESINOID CUTTING BLADE

[75] Inventors: Gideon Levinson, Mitzpe; Eran Goldberg, Nesher, both of Israel

[73] Assignee: Kulicke and Soffa Investments Inc, Wilmington, Del.

[21] Appl. No.: 242,721

[22] Filed: May 13, 1994

[51] Int. Cl.$^6$ .................................................. B28D 1/04
[52] U.S. Cl. ................................................ 125/15; 451/543
[58] Field of Search ......................... 125/15, 13.01; 51/206 R, 206 P, 206.4, 206.5, 267, 266; 451/541, 542, 543, 547, 449, 450, 527, 528

[56] References Cited

U.S. PATENT DOCUMENTS

| | | | |
|---|---|---|---|
| 927,164 | 7/1909 | Puffer | 125/15 |
| 3,628,292 | 12/1971 | Rue | 125/15 |
| 3,886,925 | 6/1975 | Regan | 125/15 |
| 4,219,004 | 8/1980 | Runyon | 125/15 |
| 4,624,237 | 11/1986 | Inoue | 125/15 |

FOREIGN PATENT DOCUMENTS

| | | | |
|---|---|---|---|
| 0141130 | 4/1980 | Germany | 451/528 |
| 0120979 | 9/1980 | Japan | 451/528 |
| 4025379 | 1/1992 | Japan | 51/206.4 |
| 0872234 | 10/1981 | U.S.S.R. | 451/528 |

*Primary Examiner*—Robert A. Rose
*Attorney, Agent, or Firm*—John B. Sowell

[57] ABSTRACT

A diamond impregnated saw blade of the type used in dicing saws is adapted for mounting on a high cooling flange or standard flange hubs and useful for cutting very hard objects. The saw blade is made in the form of an annular ring comprising a homogenous mixture of diamonds held in situ by a binder material and is characterized by alternately spaced raised teeth and recessed cooling grooves through which a stream of cooling fluid is directed into the kerf of an object being cut as well as on all cutting surfaces of the cutting saw blade.

13 Claims, 4 Drawing Sheets

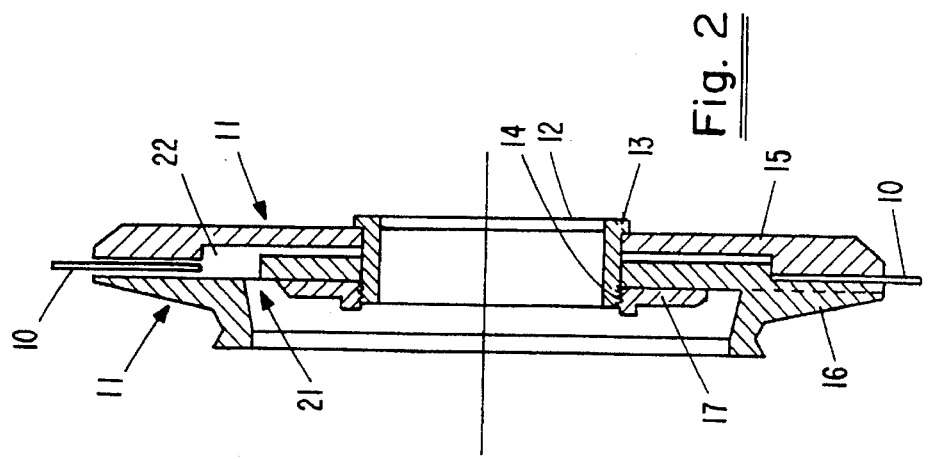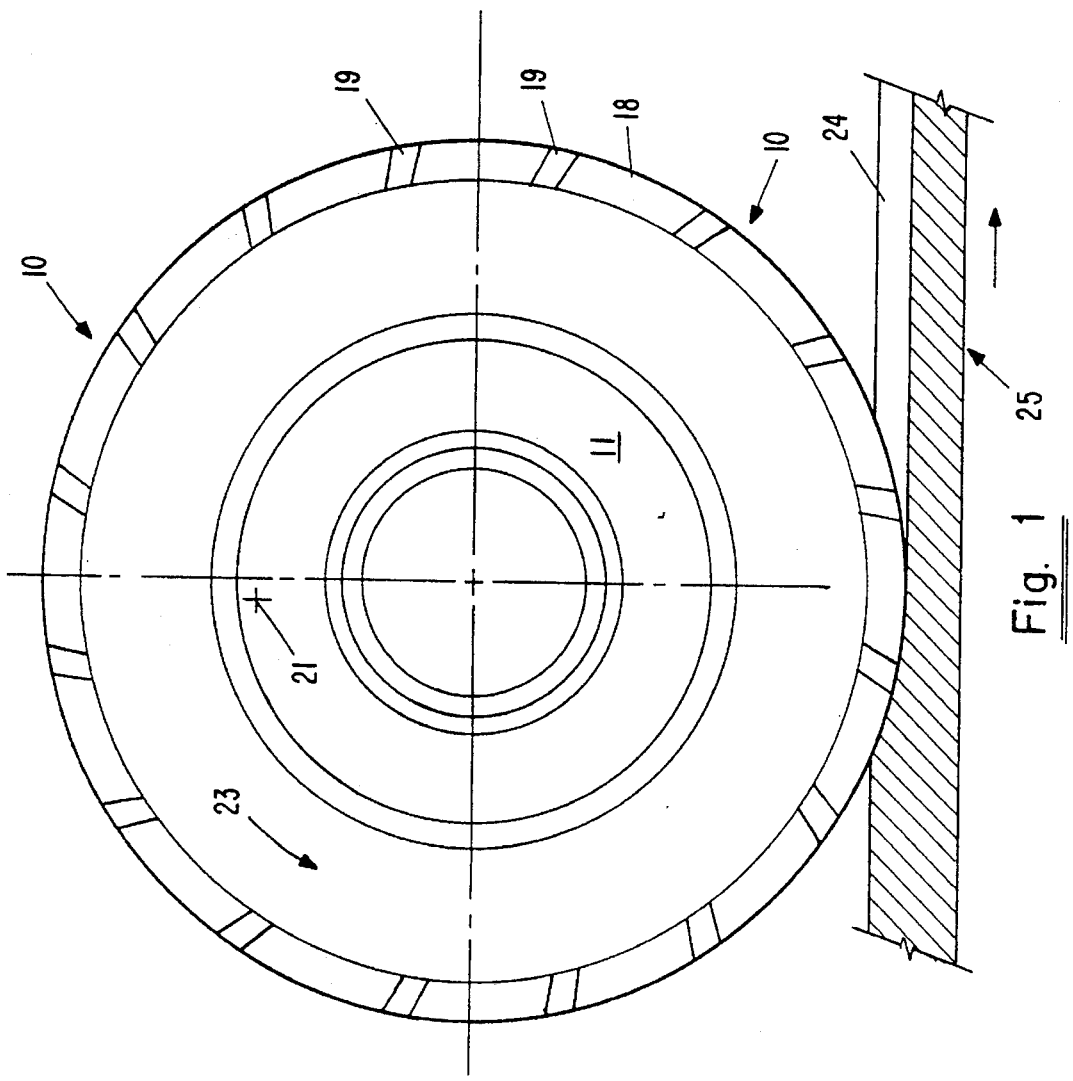

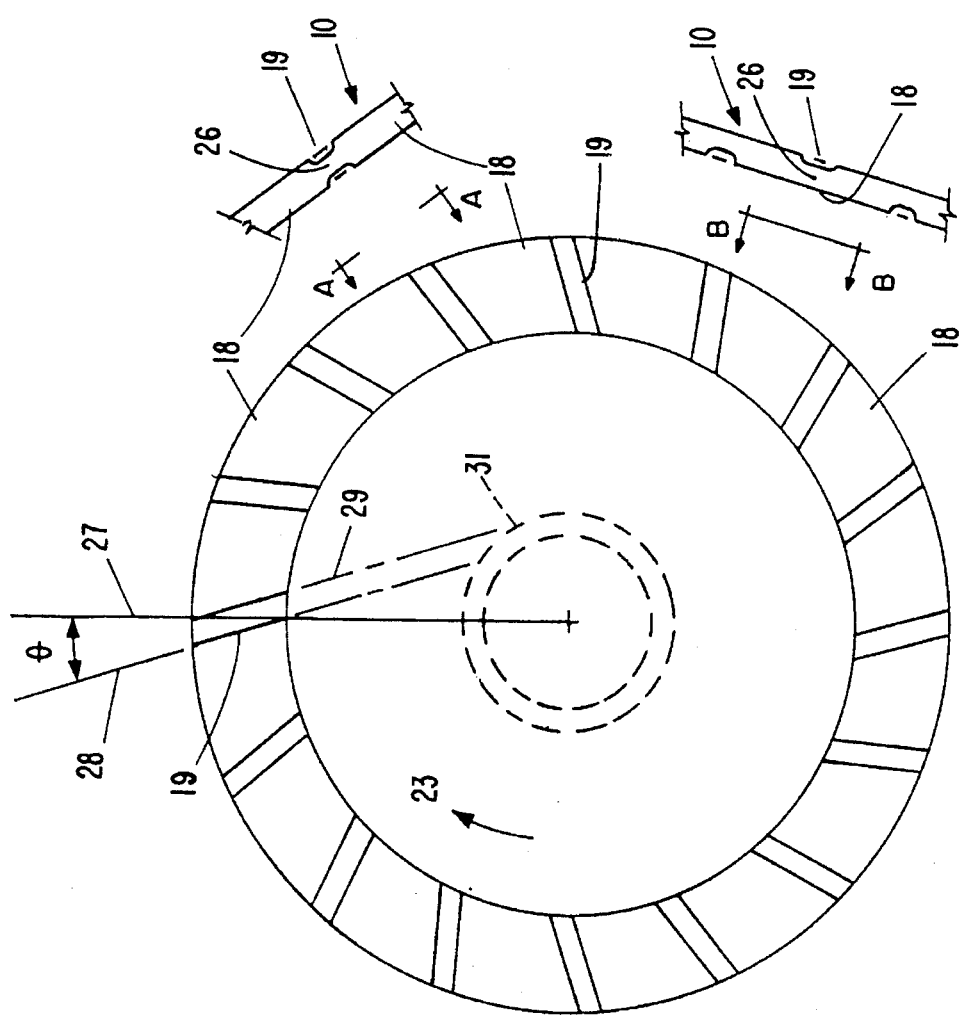
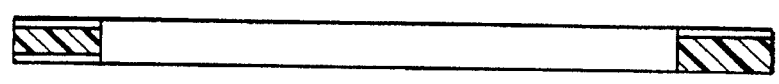
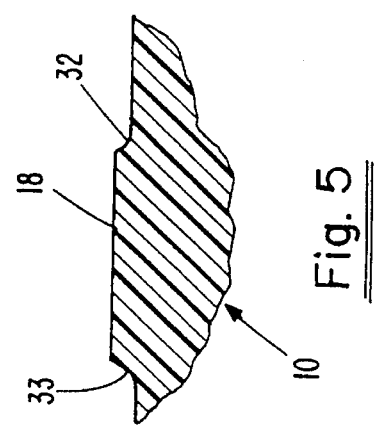

DIAMOND IMPREGNATED RESINOID CUTTING BLADE

BACKGROUND OF THE INVENTION

1. Field of the Invention

The present invention relates to saw blades of the type used in the semiconductor and electronics industry for cutting very hard and brittle objects. More particularly, the present invention relates to an improved diamond impregnated saw blade for cutting very hard objects.

2. Description of the Prior Art

Heretofore, saw machines or dicing machines were known for cutting semiconductor wafers along orthogonal lines or streets to separate individual die (semiconductor dice) one from another. Such dicing machines or saws are commercially available from several manufacturer's including Disco Abrasive Systems, Inc. of Tokyo, Japan and Kulicke and Soffa Industries, Inc. of Willow Grove, Pa. (the assignee of the present invention).

Dicing saw blades have been made in the form of annular disc that are clamped between flanges of a composite hub that accurately positions the thin flexible saw blades. Such annular disc saw blade employ a fine powder of diamond particles that are held entrapped in the saw blade as the hard agent for cutting semiconductor wafers and other very hard objects. The diamond particles may be bonded onto the surface of a metal blade, impregnated into a plated metal blade or impregnated into a powered metal or resinoid carrier that is subsequently cured under heat and pressure. While other variations of blades exist, diamond impregnated blades have been found to cut hard objects cleaner and last longer than other types of blades.

Heretofore, it was generally known that the size of diamond particles used in dicing saw blades affects the wear, speed and quality of cuts made on different objects. Accordingly, when a new application or substance was to be cut, blades with different diamond particle sizes employing different blade binders were tried to achieve minimum blade wear, quality cutting without chipping, or breakage and maximum throughput.

Accordingly, it would be desirable to provide a novel saw blade which lasts longer, cuts smoother and faster than dicing saw blades known heretofore.

SUMMARY OF THE INVENTION

It is a primary object of the present invention to provide a new dicing saw blade for cutting very hard objects with minimum blade wear.

It is a primary object of the present invention to provide a simplified method of making a resinoid dicing saw blade with formed cutting and cleaning blades.

It is a primary object of the present to provide an integral grooved blade for a dicing saw that cuts cleaner, has less wear and generates less heat.

It is a general object of the present invention to provide a novel shape diamond impregnated saw blade for cutting very hard objects with a minimum of power and blade wear.

It is a general object of the present invention to provide a resinoid saw blade for cutting hard objects that cuts free and cleans out object residue without causing damage or cracks in the object being cut.

According to these and other objects of the present invention, there is provided a dicing saw blade having side surface cooling grooves for mounting in a well known standard flange hub or in a high cooling flange hub which directs cooling fluid radially outward parallel to the sides of the dicing saw blade. The dicing saw blade comprises an annular ring having a plurality of alternately connected raised cutting teeth and recessed cooling groves which conduct cooling fluid onto the sides of the object being cut and contacts the sides of the raised cutting blades.

BRIEF DESCRIPTION OF THE DRAWINGS

FIG. 1 is a front elevation of the present invention diamond impregnated resinoid dicing saw blade mounted in a high cooling flange hub;

FIG. 2 is a section in side elevation of the hub shown in FIG. 1 showing the outer and inner flanges which clamp the dicing saw blade;

FIG. 3 is a front elevation of the present invention dicing saw blade showing two different cooling blade arrangements;

FIG. 4 is a partial section in side elevation of the dicing saw blade shown in FIG. 3;

FIG. 5 is an enlarged partial section of the edges of a raised cutting tooth on a saw blade;

DESCRIPTION OF THE PREFERRED EMBODIMENTS

Figure 6:
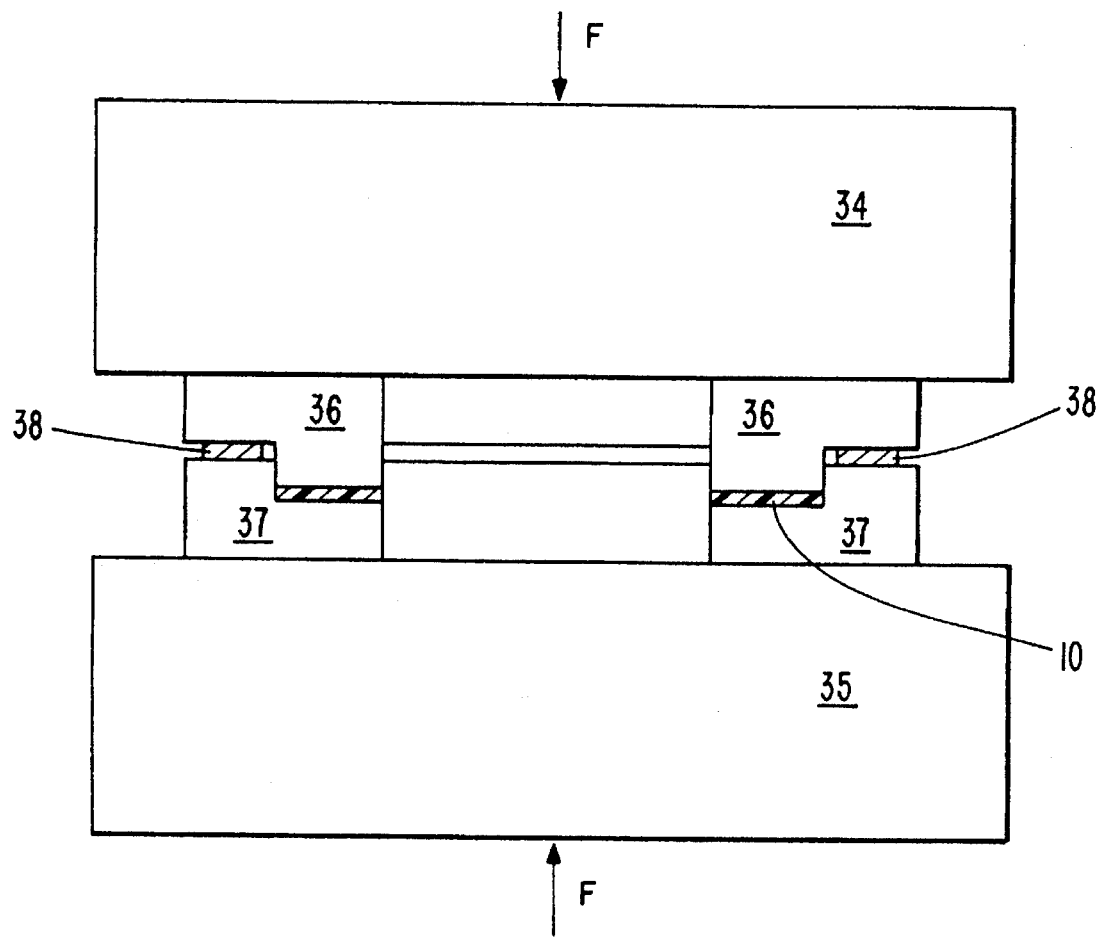
FIG. 6 is a schematic drawing in partial section taken through a set of dies mounted in a hot resinoid curing press.

Refer now to FIG. 1 showing in side view the present invention resinoid saw blade 10 mounted in a high cooling flange hub 11. Refer also to FIG. 2 showing in side elevation the hub 11 in cross section holding a saw blade 10. The preferred cooling flange hub 11 is made in four parts. The support hub 12 is provided with a flange 13 on one end and threads 14 on the other end. An outer flange 15 and an inner flange 16 are slidably mounted on support hub 12 in a manner which clamps a saw blade 10 therebetween. A clamp ring 17 is adapted to be attached by threads 14 to support hub 12 in a manner which holds the parts of the cooling flange hub 11 together supporting an annular saw blade 10.

The saw blade 10 is provided with alternate interconnected raised cutting teeth 18 and cooling groves 19. When a stream of cooling fluid such as ionized or tap water or special fluids is directed as a stream 21 into the hollow cavity 22 between flanges 15 and 16, it is thrown radially outward by the centrifugal force of hub 11 and caused to exit along the grooves 19 in the sides of the saw blade 10 as best shown at the top of FIG. 2.

As best shown in FIG. 1, the grooves 19 are not radially directed but angle away from a true radial direction by approximately twenty degrees and are inclined in the direction of rotation shown by arrow 23. The angular directed grooves 19 feed cooling fluid into all three sides of the kerf 24 of object 25 being cut. The same cooling fluid which coats the vertical sides of kerf 24 is available as lubricant and a cooling layer for the teeth 18. The cooling fluid which flows through the grooves or passageways 19 picks up particles cut from the kerf 24 and discharges them as the saw blade 10 turns and rises out of the kerf 24. Further, the cooling fluid is being applied to the substrate or object 25 ahead of saw blade 10 as it makes its heat generating cut, thus, cooling the object before, during and after the cut in a manner which improves blade wear and reduces chipping and breakage.

Refer now to FIG. 3 showing a front elevation of the reverse side of a dicing saw blade 10 with the hub 11 removed to reveal the full length of the cooling grooves 19 alternately spaced between raised cutting teeth 18. In one preferred embodiment arrangement shown at section A—A, the grooves 19 are arranged as mirror images on opposite sides. This provides the minimum vibration of the flexible blade 10 but also reduces the base width 26 of the annular disk to a minimum. Thick blades are not affected by this preferred arrangement in which the grooves 19 leave at least thirty percent of the blade in the base width or thickness.

When new blades 10 are made very thin, the preferred arrangement is shown at section B—B where the grooves 19 on opposite sides are offset at one-half the pitch between adjacent grooves 19. This arrangement has the advantage that the saw blade base width or thickness 26 is a maximum. Any tendency toward minor vibration due to the unsymmetrical configuration can be reduced by increasing the number of grooves 19 and teeth 18.

FIGS. 3 and 4 show a full length of the groove 19 and the angle θ which represents the deviation or degree of incline away from a true radial direction shown at line 27. The angle θ of the groove 19 is shown having extended parallel phantom lines 28 and 29 which are tangent to circles 31. Enlargement of circles 31 increase the angle theta (θ) which may be formed up to 45° but is shown to be approximately twenty degrees.

Homogeneous resinoid dicing saw blades are usually made in widths up to 100 mils, thus the teeth 18 are preferably offset as shown at B—B to provide a continuous disk having a width or thickness 26.

Homogeneous electro deposited nickel dicing saw blades are usually made in widths up to twenty mils, thus the teeth 18 may be made as shown at A—A or B—B and may further include an edge slot (sometimes called serrations) between grooves or pairs of grooves 19.

Metal or steel core blades having diamond teeth 18 deposited or built up on the core are usually made in widths up to three millimeters, thus the grooves 19 may be offset or mirror imaged and also may have seriations between grooves or pairs of grooves 19.

Homogeneous sintered blades are made using powder metallurgical techniques and are usually made in widths up to three millimeters, thus may be made with offset or mirror image grooves 19 with or without serrations between grooves or pairs of grooves. The present invention grooves 19 may be formed or fine finished using EDM techniques.

Refer now to FIG. 5 showing an enlarged cutting tooth 18 which rises above the adjacent groove 19. The sides 32 of the teeth 18 are preferably inclined at approximately 45° and a rounded fillet 33 is provided at the transition point between the side 32 and the groove 19 which eliminates stress concentrations that cause cracks.

Refer now to FIG. 6 showing a schematic drawing in partial section taken through a set of dies mounted in a curing press having an upper platen 34 and a lower platen 35 which are both provided with heaters and means to control the temperature (not shown) of the upper die 36 and the lower die 37. The die set is shown having an annular cutting blade 10 entrapped between dies 36 and 37. In the preferred method of making blades 10 a force F is applied by a hydraulic press while a green stage annular ring is pressed between dies 36–37 heated to approximately 150° C. Shims 38 limit the excursion of the dies and also control the density and final thickness of the cutting blade 10. The dies 36 and 37 are provided with a negative or reverse profile of the face of the cutting blade being formed.

The green stage ring may be prepared in advance of final curing by partially curing the mixture of resin, filler and diamonds at a lower temperature than the final curing temperature. Techniques for preparing green stage phenolic resinoid blades are well known and do not require a detailed explanation herein.

An object of the present invention was to make a resinoid diamond impregnated saw blade for cutting very hard objects which was possible employing existing commercially available cutting blades. However, when very hard objects are cut with resinoid blades, blade wear becomes a cost factor which cannot be ignored. It was known that an increase in the particle size of the diamonds used had a tendency to decrease blade wear, but the effect of providing cooling grooves to reduce heat buildup, breaking and chipping had not been explored heretofore.

Figure 7:
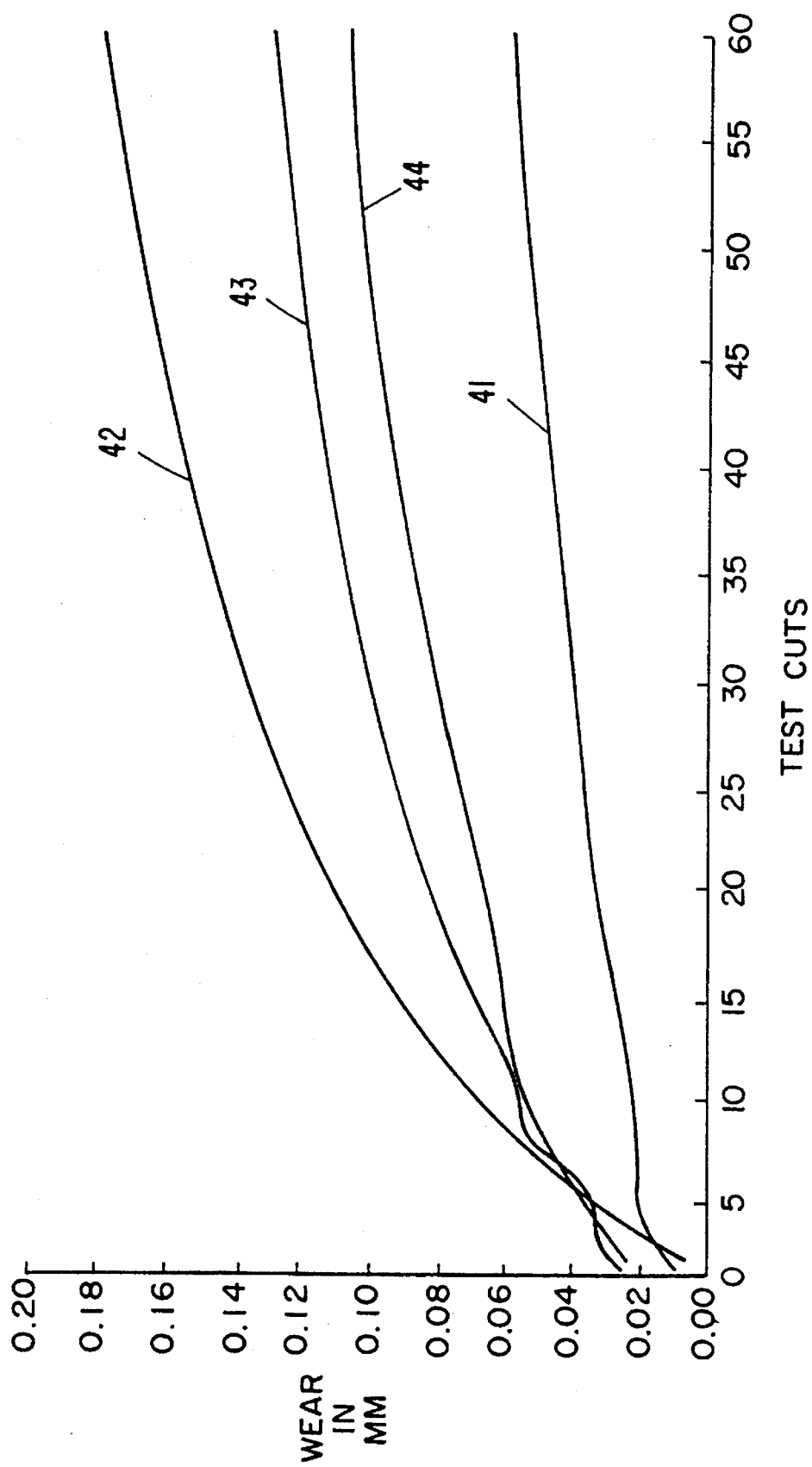
FIG. 7 is a schematic waveform drawing showing the enhanced wear characteristics achieved by the present invention dicing saw blades.

Refer now to FIG. 7 showing a schematic waveform drawing which illustrates the enhanced wear characteristics achieved by the present invention saw blades. Tests were performed with a Model 780 Dicing Saw made by Kulicke and Soffa Industries, Inc. The blades employed were provided with sixteen cooling grooves and were approximately one-eighth inch thick. Saw blades having six to sixty-four cooling grooves and two to three mils deep would produce a similar series of waveforms showing improved blade wear.

Waveform 41 with cooling grooves 19 had the least wear and also had the flattest slope curve. Waveform 42 like waveform 41 employed 125 micron diamond particles, but had no cooling grooves 19. Waveform 43 also employed 125 micron diamond particles and was heavily loaded with diamonds but had no cooling grooves 19. Waveform 44 had no cooling grooves 19 but was impregnated with larger 200 micron size or mesh diamonds, thus, showed an improvement over waveform 43 but more wear than the present invention waveform 41.

FIG. 7 illustrates that once the size of the diamonds is established to achieve a desired smoothness and speed of cut, the accumulated wear can be reduced by providing the preferred embodiment cooling grooves 19 or a reasonable equivalent thereof.

Not only does the new saw blade cut cleaner and cooler and last longer, but it has the desirable characteristic of producing fewer chips and cracks. The cooling grooves 19 can also be provided on sintered saw blades or on nickel saw blades but are not intended to cut highways or streets in semiconductor wafers to separate individual die from a wafer where blade widths are about one mil wide. One way of providing such cooling grooves in a nickel saw blade is to mask off the grooves and plate the teeth 18 onto a base thickness annular ring. Thick blade can be made by employing a preformed base ring having the profile needed for grooves and teeth thereon before applying diamonds. Sintered homogeneous saw blades may be made by conventional methods and the cooling grooves added by EDM.

Having explained the preferred embodiment of the present invention self cooling saw blade with reference to resinoid diamond impregnated saw blades which are preferred for cutting very hard metals such as tantalum it will be understood that the same structure may be employed on other types of blades when cutting other hard materials, especially those that tend to chip or break due to high heat generated during cutting.

Since the present invention cooling grooves are known to provide lubrication as well as cooling for the cutting blade surfaces, the grooves also provide longer blade wear. The novel raised side cutting teeth may be applied to homogeneous deposited nickel blades or diamonds deposited on core disk blades as well as to powder metallurgical sintered saw blades to decrease wear and heat generated in a saw kerf.

We claim:

1. A diamond impregnated resinoid dicing saw blade having side cutting surfaces, comprising:

a continuous annular ring shape for cutting hard objects comprising a homogeneous cured mass of resin and filler impregnated with substantially uniform sized diamond particles, said annular ring shape having a continuous cutting edge at its outside diameter and discontinuous cutting edges extended completely across the side cutting surfaces, said side cutting surface comprising a plurality of non-symmetrical cutting teeth raised across said sides of said continuous annular ring shape and a discontinuous flat plane surface for mounting in a cooling flange hub, and recessed cooling grooves formed between adjacent cutting teeth in said annular ring shape, whereby said recessed cooling grooves providing means for conducting a cooling fluid radially outward from said cooling flange hub in said recessed cooling grooves for simultaneously cooling the cutting edges of said saw blade and the hard object being cut.

2. A diamond impregnated saw blade as set forth in claim 1 wherein said saw blade comprises an annular ring having an outside diameter of fifty to approximately one hundred twenty-five millimeters and a width of less than three millimeter.

3. A diamond impregnated saw blade as set forth in claim 1 where said recessed cooling grooves are substantially parallel and inclined at an angle of approximately 20° degrees from a true radial direction.

4. A diamond impregnated saw blade as set forth in claim 3 wherein said cooling grooves on opposite sides of said saw blade are offset from each other by a distance of one-half the pitch distance between the cooling grooves and occupy substantially less area than said cutting teeth.

5. A diamond impregnated saw blade as set forth in claim 1 wherein said cooling grooves comprise a plurality between 6 and 64 equally spaced grooves.

6. A diamond impregnated saw blade as set forth in claim 5 wherein the transition between said cooling grooves and said raised cutting teeth form an angle of approximately forty-five degrees.

7. A diamond impregnated saw blade as set forth in claim 6 wherein the height of said raised cutting teeth is approximately one-third to one-fourth the width of said saw blade.

8. A diamond impregnated saw blade as set forth in claim 1 wherein said homogeneous cured mass comprises a high temperature phenolic, said filler material comprising a ceramic powder and said uniform sized diamond particles comprise a uniform grit mesh size between 50 and 350 microns.

9. A self cooling diamond impregnated saw blade for cutting hard objects having side cutting surfaces, said saw blade comprising:

an annular ring shaped cutting blade having two side surfaces, for mounting in a high cooling flange hub, a plurality of non-symmetrical raised cutting teeth extending completely across said side surfaces of said annular ring shaped cutting blade, recessed cooling grooves formed in the space between adjacent raised cutting teeth for conducting cooling fluid radially outward during a cutting operation and for cooling the object being cut and said raised cutting teeth, and said raised cutting teeth comprising a homogenous mass of substantially uniform sized diamond particles and a binder made integral with said annular ring shaped cutting blade.

10. A self cooling diamond impregnated saw blade as set forth in claim 9 wherein said annular ring shaped cutting blade and said spaced raised cutting teeth compromise a single homogenous mass of said diamond particles encapsulated in said binder cured under pressure and temperature.

11. A self cooling diamond impregnated saw blade as set forth in claim 9 wherein said binder comprises a high temperature resinoid binder cured in heated forming dies.

12. A self cooling diamond impregnated saw blade as set forth in claim 9 wherein said binder comprises a powder metal ring shaped saw blade adapted to be sintered at high temperature.

13. A self cooling diamond impregnated saw blade as set forth in claim 9 wherein said binder comprises electroplated nickel for encapsulating said diamond particles.

* * * * *